US012754119B2

(12) United States Patent
Dethlefsen et al.

(10) Patent No.: US 12,754,119 B2
(45) Date of Patent: Oct. 6, 2026

(54) AUTOMATIC ANALYZER AND METHOD FOR OPTICALLY ANALYZING A BIOLOGICAL SAMPLE

(71) Applicant: Siemens Healthcare Diagnostics Inc., Tarrytown, NY (US)

(72) Inventors: Mark Dethlefsen, Erlangen (DE); Thomas Engel, Aalen (DE); Ramona Seliger, Wiesenttal (DE); Abhijeet A. Joshi, Bangalore (IN); Mohiudeen Azhar, Bangalore (IN); Martin Kraus, Fürth (DE); Tivadar Mach, Berlin (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 115 days.

(21) Appl. No.: 18/875,131

(22) PCT Filed: Jun. 13, 2023

(86) PCT No.: PCT/EP2023/065702
§ 371 (c)(1),
(2) Date: Dec. 14, 2024

(87) PCT Pub. No.: WO2023/242143
PCT Pub. Date: Dec. 21, 2023

(65) Prior Publication Data

US 2025/0369852 A1 Dec. 4, 2025

(30) Foreign Application Priority Data

Jun. 15, 2022 (EP) .................................... 22179080

(51) Int. Cl.
*G01N 15/1429* (2024.01)
*G01N 15/0227* (2024.01)
(Continued)

(52) U.S. Cl.
CPC ..... *G01N 15/0227* (2013.01); *G01N 15/1429* (2013.01); *G01N 2015/012* (2024.01);
(Continued)

(58) Field of Classification Search
CPC .... G01N 15/14; G01N 15/1493; G06V 10/82; G06V 20/698
See application file for complete search history.

(56) References Cited

U.S. PATENT DOCUMENTS

| | | | | |
|---|---|---|---|---|
| 2022/0043251 | A1 | 2/2022 | Moore et al. | |
| 2022/0282203 | A1 * | 9/2022 | Wagner | B01L 3/502715 |
| 2022/0284574 | A1 * | 9/2022 | Wagner | B01L 3/502715 |

FOREIGN PATENT DOCUMENTS

| | | | | | |
|---|---|---|---|---|---|
| KR | 20210155397 | A * | 12/2021 | | G06N 3/045 |
| WO | WO-2020131864 | A1 * | 6/2020 | | G06V 20/698 |
| WO | 2021150973 | A1 | 7/2021 | | |

OTHER PUBLICATIONS

Thanh Nguyen, "Deep learning approach to Fourier ptychographic microscopy", 2018 (Year: 2018).*
(Continued)

*Primary Examiner* — Maurice C Smith
(74) *Attorney, Agent, or Firm* — Dugan & Dugan, PC

(57) ABSTRACT

An automatic analyzer for optically analyzing a biological sample comprises a flow-cell with a first inlet port for introducing the sample into the flow-cell or means for applying the sample onto a specimen holder. Further, the analyzer comprises a Fourier Ptychography Microscope (FPM) for optically analyzing the sample in the flow-cell or the sample on the specimen holder by obtaining multiwavelength FPM data, and a control module comprising computer means which are configured for identifying regions of interest based at least on part of the FPM data by employing an artificial intelligence algorithm and to reconstruct an amplitude and/or phase image of the sample only in the
(Continued)

regions of interest based on the FPM data for the regions of interest to minimize the computational time required for the FPM reconstruction process.

20 Claims, 3 Drawing Sheets

(51) Int. Cl.
*G01N 15/01* (2024.01)
*G01N 15/14* (2006.01)

(52) U.S. Cl.
CPC .................. *G01N 2015/016* (2024.01); *G01N 2015/1493* (2013.01)

(56) References Cited

OTHER PUBLICATIONS

Christopher Bendkowskia, "Histological and Cytological Imaging using Fourier Ptychographic Microscopy", 2021 (Year: 2021).*
Jizhou Zhang, "High-Throughput Deep Learning Microscopy Using Multi-Angle Super-Resolution", 2, Apr. 2020 (Year: 20).*
Chung, J., et al.: :Counting White Blood Cells from a Blood Smear Using Fourier Ptychographic Microscopy; PLoS ONE, vol. 10, No. 7, 2015: e0133489. doi:10.1371/journal.pone.0133489; (2015).
Green, R., et al.: "Development, History and Future of Automated Cell Counters"; Clinics in Laboratory Medicine, Mar. 2015, DOI: 10.1016/j.cll.2014.11.003; (2015).
Majeed, H., et al.: "Quantitative phase imaging for medical diagnosis", Journal of Biophotonics, 2017, DOI: 10.1002/jbio.201600113; (2017).
Marrison, J., et al.: "Ptychography—a label free, high-contrast imaging technique for live cells using quantitative phase information", Scientific Reports, 3: 2369 | DOI: 10.1038/srep02369; (2013).

* cited by examiner

AUTOMATIC ANALYZER AND METHOD FOR OPTICALLY ANALYZING A BIOLOGICAL SAMPLE

CROSS REFERENCE TO RELATED APPLICATIONS

This is a 371 of PCT/EP2023/065702, filed Jun. 13, 2023, which claims priority to European Patent Application No. EP 22179080.1, filed Jun. 15, 2022, both of which are hereby incorporated by reference herein in their entireties for all purposes.

FIELD

The disclosure relates to an automatic analyzer comprising a multiwavelength Fourier Ptychography Microscope (FPM) for optically analyzing a biological sample and a method for optically analyzing the sample.

BACKGROUND

Calculating cell parameters related to hemoglobin concentration and cell morphology of red blood cells (RBCs) is a key part of performing a complete blood count (CBC). Currently, determining such parameters usually involves a combination of methodologies like cytometry, impedance, and optical measurements. Thus, reliable instruments tend to be highly complex with relatively slow test turn-around times and are often based in central laboratories.

Usually, a large number of images is required to obtain statistically relevant results at sufficiently high resolution required to clearly visualize and differentiate RBCs/WBCs due to a typically inverse relationship between field of view and resolution.

Further, conventional light microscope images collected by CCD cameras contain amplitude information only. To form an image on the detector, the sample thus needs to sufficiently absorb light. This is often problematic as many biological samples exhibit only very small absorption of light in the visible part of the spectrum. Staining of samples or cells is therefore often required to visualize key features like, e.g., the nucleus of a white blood cell.

An alternative way of gaining information from light passing through a sample is by analyzing an optical phase-shift of the light-wave due to changes in refractive index within the sample. Determining the phase-shift of light passing through blood cells would generally allow to obtain all relevant information required to calculate, e.g., morphology and hemoglobin concentration related parameters of red blood cells, as well as identifying the nuclei of WBCs. However, imaging systems that can measure phase-shifts of a light-wave passing through an object tend to involve complex optics and often it is also unclear to what extent the calculated phase is actually of a quantitative nature. Further, such instruments often only work at a single wavelength which usually does not allow to decouple morphology information from concentration information.

Usually, a combination of technologies is being used to perform cell differentiation and to calculate parameters related to morphology and hemoglobin concentration of red blood cells (RBCs) in a clinical setting. For example, flow cytometry-based methods are used to calculate the number of cells in a given volume while light scattering and/or impedance measurements are used to classify cells. Absorption based measurements, which are often performed on lysed blood samples are used to determine the overall hemoglobin concentration.

Some phase-based approaches have been proposed for use in hematology and pathology. For example, phase contrast microscopy can be used to image unstained samples, but most methods employed do not result in quantitative phase information. Furthermore, the methods employed often only use a single wavelength for phase determination. Therefore, it is generally not possible to calculate cell morphology and hemoglobin concentration from the results. Also, the use of methods resulting in quantitative phase information has been proposed. However, these methods have significant drawbacks as they typically rely on more complicated technologies for phase determination like, e.g., digital holographic microscopy and use often only a single wavelength which does not allow for a parallel determination of hemoglobin concentration and morphology.

It would be advantageous and there is a need to provide a technical solution to more rapidly determining CBC parameters in a simple instrument using small sample volumes to be employed in a point of care setting thus improving time-to-result and throughput, and quality of care.

Further, it would be advantageous and there is a need to provide a technical solution allowing a parallel determination of hemoglobin concentration and morphology of cells in, e.g., blood samples.

SUMMARY OF THE INVENTION

The inventors found a device and a method for optically analyzing a biological sample which is based on combining multiwavelength Fourier Ptychography Microscopy (FPM) of an unstained blood sample in a flow cell with AI based rapid identification of all regions of interest in order to minimize the computational time required for the FPM reconstruction process. E.g., the obtained phase information can then be used to calculate all red blood cell related parameters of a CBC, thereby removing the need to combine multiple measurement technologies in a single instrument.

Preferably this is achieved according to the invention by determining the quantitative phase of a large number of white blood cells (WBCs), red blood cells (RBCs), and platelets in single field of view at various wavelengths via FPM.

To minimize computation time, image reconstruction is preferably restricted to cells of interest through the identification of regions of interest.

From the phase information, parameters such as hemoglobin concentration, cell height, and cell volume can be determined for each individual cell. This allows to calculate all relevant RBC related parameters of a complete blood count.

Further, preferably white blood cell types are differentiated, and platelets are analyzed. Thus, resulting in the potential to perform a complete blood count from a single measurement.

FPM is a relatively new computational imaging technology using coded illumination. By illuminating a sample from multiple angles and combining the resulting images in Fourier Space via an algorithm based preferably on the Gerchberg-Saxton algorithm, it is possible to generate images with resolution far exceeding the numerical aperture (NA) of the employed microscope objective. At the same time, the quantitative phase shift of the measured light can be calculated. This way it becomes now possible to generate large field of view phase images of biological samples, preferably larger or much larger than 1 square mm at high resolutions of below or far below 1 micrometer. Advantageously comparably economical optics can be used.

The obtained phase images at various wavelengths can preferably be used to calculate, e.g., cell thickness and hemoglobin concentration via the following equation (i).

$$\Delta\phi(x, y, \lambda) = k\_0\ [\beta(\lambda)\, C(x, y) + \Delta n\_ws\ (\lambda)]\, h(x, y) \qquad \text{(i)}$$

With Δϕ denoting the observed phase shift, h the height, and C the hemoglobin concentration; Δnws denotes the refractive index difference between water and the surrounding medium, β denotes the rate of change of the refractive index of hemoglobin, λ denotes the wavelength, x and y denote coordinates, and k_0=2π/λ. The equation (i) also illustrates that measurements at various wavelengths are required to decouple hemoglobin concentration and cell height. Analogous, the volumes of platelets can preferably be calculated.

Preferably, the resulting phase-shifts can also be used to create phase contrast images. From these images it is advantageously possible to perform at least a 3-part differentiation of WBCs, preferably at least a 5-part differentiation of WBCs, thereby enabling to perform a CBC from a single measurement in a flow cell with minimal sample preprocessing.

One potential, general drawback of the FPM approaches is the relatively long time required to analyze a full field of view in multiple wavelengths. E.g., depending on the employed hardware this could easily exceed 1 hour in typical biological, diagnostic, or medical applications. This may in particular limit the use of this technology, e.g., in Point of Care clinical settings. To overcome such limitations, the present invention thus provides a method to preferably limit the amount of data that needs to be analyzed by identifying areas of interest, such areas, e.g., comprising a cell. Preferably, this can be achieved, e.g., by reconstructing a high-resolution FPM image at a single wavelength and to use this image to identify regions of interest, e.g., cells, and classify the cells at the same time. In an alternative approach, instead of performing a reconstruction using all available images acquired at a given wavelength, the reconstruction can also be performed using a subset of images, chosen in such a way that the achieved resolution is large enough to identify regions of interest (ROI). This step is then followed by performing image reconstruction of all identified ROIs across multiple colors. Part of this approach would also be the extreme case, that the available resolution prior to reconstruction is already large enough to identify regions of interest and no reconstruction is needed. In the latter case, classification into, e.g., RBCs, WBCs, and Platelets would happen post reconstruction. While both options lead generally to a reduction of the computational burden, the latter option preferably results in the highest speed gain.

Preferably, e.g., region of interest identification, cell classification, and/or WBC differentiation can all be performed using an artificial intelligence (AI) based algorithm as has been demonstrated for other imaging techniques, preferably, e.g., via a neural network approach. For such approaches, sufficiently large training sets would need to be generated.

FPM reconstruction algorithms produce both an amplitude image and a phase image during the reconstruction process. Thus, advantageously either image, and/or both images, could be used during the classification and/or differentiation process.

The general principle of the present invention is in particular suited to, e.g., performing a CBC on a blood sample and/or cells in a flow cell but can also be directly transferred and applied to other sample types relying on an optical read-out of a large area at a high resolution. Such samples may comprise, e.g., blood smears, pathology slides, and/or microbiology analysis of bacteria.

Using quantitative phase data obtained from whole blood samples according to the present invention preferably enables potentially much simpler workflows as compared to other currently available methods to analyze red blood cells. Preferably it, e.g., no longer required to lyse RBCs in order to determine hemoglobin concentration and/or no additional additives are required. Further, the present invention enables to acquire all relevant information needed in a single measurement, preferably on a low-cost setup, thus simplifying the workflow and reducing sample volume. The same phase information is preferably used to analyze and/or differentiate white blood cells and/or platelets. This adventurously allows to generate a CBC from a single low-cost measurement.

In particular, a first aspect of the present invention relates to a method for optically analyzing a biological sample. The method comprises i) providing a biological sample, ii) introducing the sample into a flow-cell via a first inlet port or applying the sample onto a specimen holder, iii) optically analyzing the sample in the flow-cell by obtaining at least for a part of the sample situated within a first volume of the flow-cell multiwavelength Fourier Ptychography Microscopy (FPM) data, or iv) optically analyzing the sample on the specimen holder by obtaining at least for a part of the sample situated within a first area on the specimen holder multiwavelength FPM data, v) identifying regions of interest based at least on part of the FPM data of the sample obtained in step iii) or iv) by employing an artificial intelligence algorithm, vi) reconstructing an amplitude and/or phase image of the sample only in the regions of interest obtained in step v) based on the FPM data for the regions of interest to minimize the computational time required for the FPM reconstruction process wherein the multiwavelength FPM data comprises data measured at least at two different wavelengths, preferably at least at three different wavelengths.

According to preferred embodiments, each area of interest comprises at least or precisely one biological particle, preferably at least or precisely one cell.

According to some preferred embodiments, identifying regions of interest comprises reconstructing a high-resolution FPM image at a single wavelength of the multiwavelength FPM data, wherein this high-resolution FPM image is preferably used to (a) identify regions of interest and (b) classify cells located within the regions of interest, wherein preferably step (a) and (b) are performed at the same time.

According to some preferred embodiments, identifying regions of interest comprises reconstructing a high-resolution FPM image employing at least one, preferably more than one subset of the multiwavelength FPM data, wherein preferably each subset constitutes an image of the entire part of the sample for which FPM data was obtained, wherein this high-resolution FPM image is preferably used to (a) identify regions of interest and (b) classify cells located within the regions of interest, wherein preferably step (a) and (b) are performed at the same time. The number of subsets employed for reconstruction depends preferably on the resolution of the FPM data. Preferably the number of subsets employed for reconstruction is chosen to allow obtaining a resolution in the reconstructed high-resolution FPM image sufficiently high to reliably identify and/or discriminate between RBCs, WBCs, and/or Platelets.

According to other preferred embodiments, the regions of interest are determined in the unstained raw images and wherein only those regions of interest are reconstructed, wherein preferably the regions of interest are determined without determining the cell types of cells within the regions of interest.

According to preferred embodiments, classification of cells within the regions of interest into RBCs, WBCs, and Platelets is performed after completion of image reconstruction.

According to preferred embodiments, completion of image reconstruction comprises image reconstruction for all different wavelengths and/or subsets of the multiwavelength FPM data.

According to preferred embodiments, phase images are obtained at different wavelengths and are used to calculate cell thickness and/or hemoglobin concentration.

According to preferred embodiments, the measurements at different wavelengths are employed to decouple hemoglobin concentration and cell height and/or to determine the volumes of platelets.

According to preferred embodiments, the sample comprises a blood smear, a pathology slide, and/or bacteria for microbiology analysis.

According to preferred embodiments, the biological sample was obtained from a patient, wherein preferably the sample was obtained from the patient prior to performing any step of the method.

According to preferred embodiments, the sample comprises blood cells and/or is a blood sample.

The biological sample provided for further analysis according to the present invention was preferably obtained from the patient. That means that the sample, e.g., the blood sample, was obtained from the patient prior to performing the method for analyzing the sample. Thus, the actual process of obtaining the sample from the patient is not part of the method according to the present invention.

According to preferred embodiments, the sample is unstained.

According to preferred embodiments, red blood cell parameters of a CBC, preferably all red cell blood parameters of a CBC, are calculated and/or a cell classification and WBC differentiation is determined using an AI based algorithm based on the amplitude and/or phase images.

In a second aspect, the present invention relates to an automatic analyzer for optically analyzing a biological sample. The analyzer comprises

- a flow-cell with a first inlet port for introducing the sample into the flow-cell, or means for applying the sample onto a specimen holder, the analyzer further comprising

- a Fourier Ptychography Microscope for optically analyzing the sample in the flow-cell by obtaining at least for a part of the sample situated within a first volume of the flow-cell multiwavelength FPM data or for optically analyzing the sample on the specimen holder by obtaining at least for a part of the sample situated within a first area on the specimen holder multiwavelength FPM data, and
- a control module comprising computer means which are configured for identifying regions of interest based at least on part of the FPM data of the sample obtained by employing an artificial intelligence algorithm and to reconstruct an amplitude and/or phase image of the sample only in the regions of interest based on the FPM data for the regions of interest to minimize the computational time required for the FPM reconstruction process, wherein the multiwavelength FPM data comprises data measured at least at two different wavelengths, preferably at least at three different wavelengths.

According to preferred embodiments, the control module is configured to execute a method according to the first aspect of the present invention.

In a third aspect, the present invention relates to a use of an automatic analyzer comprising a control module which is configured to execute a method according to the first aspect of the present invention.

Further aspects and embodiments of the invention are disclosed in the dependent claims and can be taken from the following description, figures, and examples, without being limited thereto.

BRIEF DESCRIPTION OF THE DRAWINGS

The enclosed drawings should illustrate embodiments of the present invention and convey a further understanding thereof. In connection with the description, they serve as explanation of concepts and principles of the invention. Other embodiments and many of the stated advantages can be derived in relation to the drawings. The elements of the drawings are not necessarily to scale towards each other. Identical, functionally equivalent and acting equal features and components are denoted in the figures of the drawings with the same reference numbers, unless noted otherwise.

DETAILED DESCRIPTION OF THE INVENTION

Definitions

Figure 1:
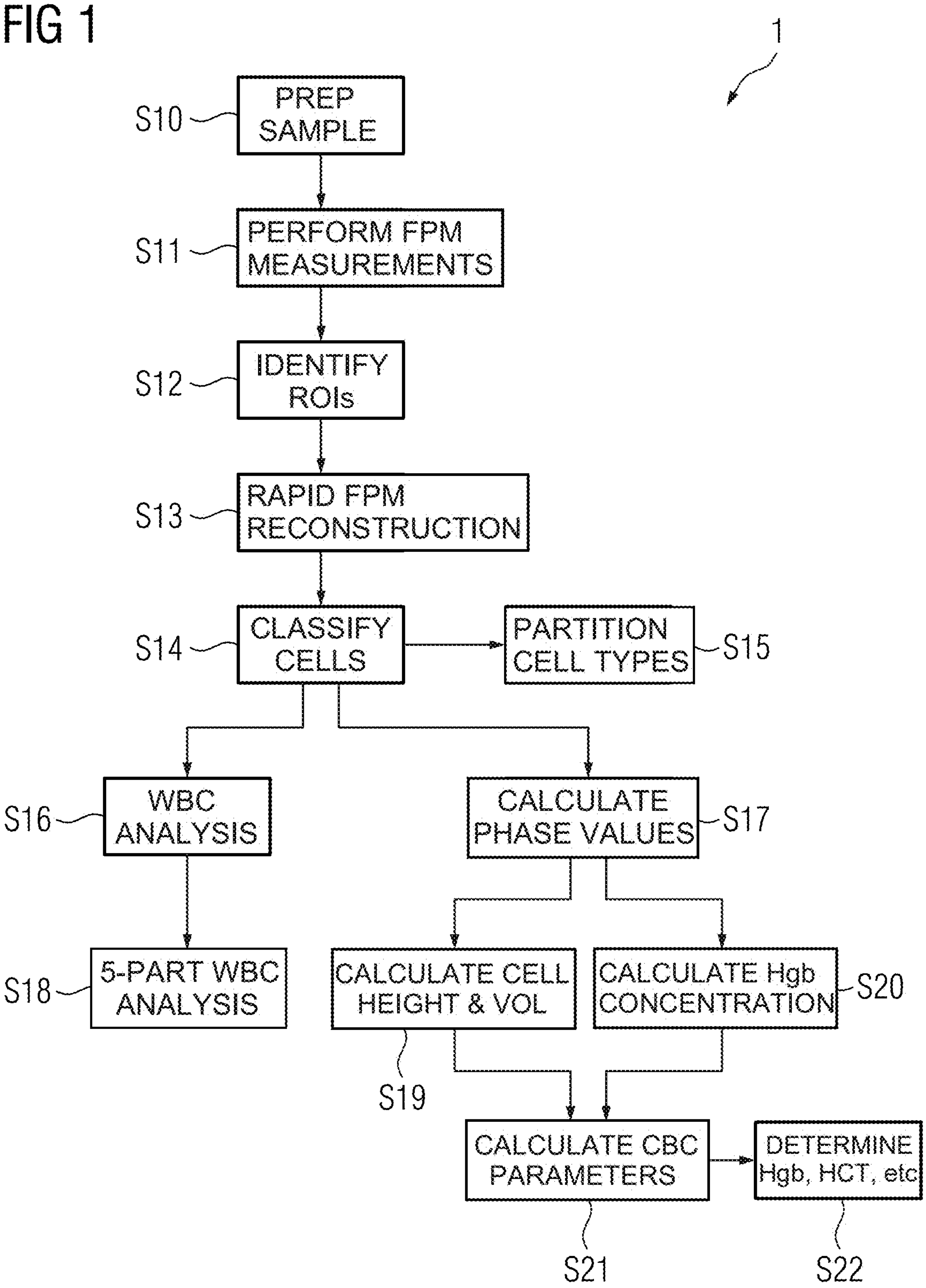
FIG. 1 shows schematically a method of optically analyzing a biological sample (1) comprising area of interest determination from raw images.

Unless defined otherwise, technical and scientific terms used herein have the same meaning as commonly understood by one of ordinary skill in the art to which this invention belongs.

In the context of the present invention, a blood sample is a sample which has been provided from a patient. Preferably, the sample is diluted and/or further processed prior to introducing it into the flow-cell for analysis. However, the sample can also be untreated, such as, e.g., a whole blood sample.

The patient within the scope of the present invention is not particularly restricted. According to certain embodiments, the patient in the present methods is a vertebrate, more preferably a mammal and most preferred a human patient.

A vertebrate within the present invention refers to animals having a vertebra, which includes mammals-including humans, birds, reptiles, amphibians, and fishes. The present invention thus is not only suitable for human medicine, but also for veterinary medicine.

Before the invention is described in exemplary detail, it is to be understood that this invention is not limited to the particular component parts of the process steps of the methods described herein as such methods may vary. It is also to be understood that the terminology used herein is for purposes of describing particular embodiments only and is not intended to be limiting. It must be noted that, as used in the specification and the appended claims, the singular forms "a," "an" and "the" include singular and/or plural referents unless the context clearly dictates otherwise. For example, the term "a" as used herein can be understood as one single entity or in the meaning of "one or more" entities. It is also to be understood that plural forms include singular and/or plural referents unless the context clearly dictates otherwise. It is moreover to be understood that, in case parameter ranges are given which are delimited by numeric values, the ranges are deemed to include these limitation values.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

An exemplary method of optically analyzing a biological sample (1) is shown schematically in FIG. 1. The method comprising a determination of an area of interest from raw images. A first method step (S10) comprises a sample preparation of an in-vitro sample. Unstained whole blood is provided within a flow cell. In a subsequent method step (S11), an FPM measurement is carried out at multiple wavelengths Lambda 1, Lambda 2, etc., which provides raw images. In a further method step (S12), ROIs (38) are identified on the raw images by employing artificial intelligence algorithms, each ROI (38) comprising a cell.

In a further embodiment, this step (S12) also includes a full FoV reconstruction in a single wavelength prior to ROI identification. This reconstruction is based on either all or a subset of the acquired FPM images in order to achieve the image resolution required to identify ROIs.

In a further method step (S13) a rapid FPM reconstruction of the identified ROIs only is performed at all relevant wavelengths Lambda 1, Lambda 2, etc.

A further method step (S14) comprises an AI based cell classification and a ROI (38) determination. In a further method step (S15), partitioning of cell types is performed and, e.g., white blood cells (WBCs), red blood cells (RBCs), and/or platelets are counted based on the output of the previous method step (S14).

Further, employing the output of this method step (S14), a WBC differentiation analysis is performed based on phase contrast information of the FPM measurements in a further method step (S16). In a further method step (S18) a five (5) part WBC differential analysis is performed based on the output of the previous method step (S16).

In a further method step (S17) which employs the output of method step (S14), i.e., the cell classification and ROI, a calculation of mean phase values for each ROI is performed for all relevant wavelengths Lambda 1, Lambda 2, etc.

In a further method step (S19) employing the output from the previous method step (S17) cell height and cell volume are calculated for each cell or ROI. In a further method step (S20) also employing the output from the earlier method step (S17) hemoglobin (Hgb) concentration is calculated for the cell, cells, or ROI (38).

Employing the output of the last two method steps (S19, S20), in a further method step (S21) morphology and/or concentration related complete blood count (CBC) parameters are calculated.

In a further method step (S22), hemoglobin (Hgb), hematocrit (HCT), mean corpuscular volume (MCV), mean corpuscular hemoglobin (MCH), mean corpuscular hemoglobin concentration (MCHC), and/or red cell distribution width (RDW) are determined.

An exemplary method of optically analyzing a biological sample (1) is shown schematically in FIG. 1.

Figure 2:
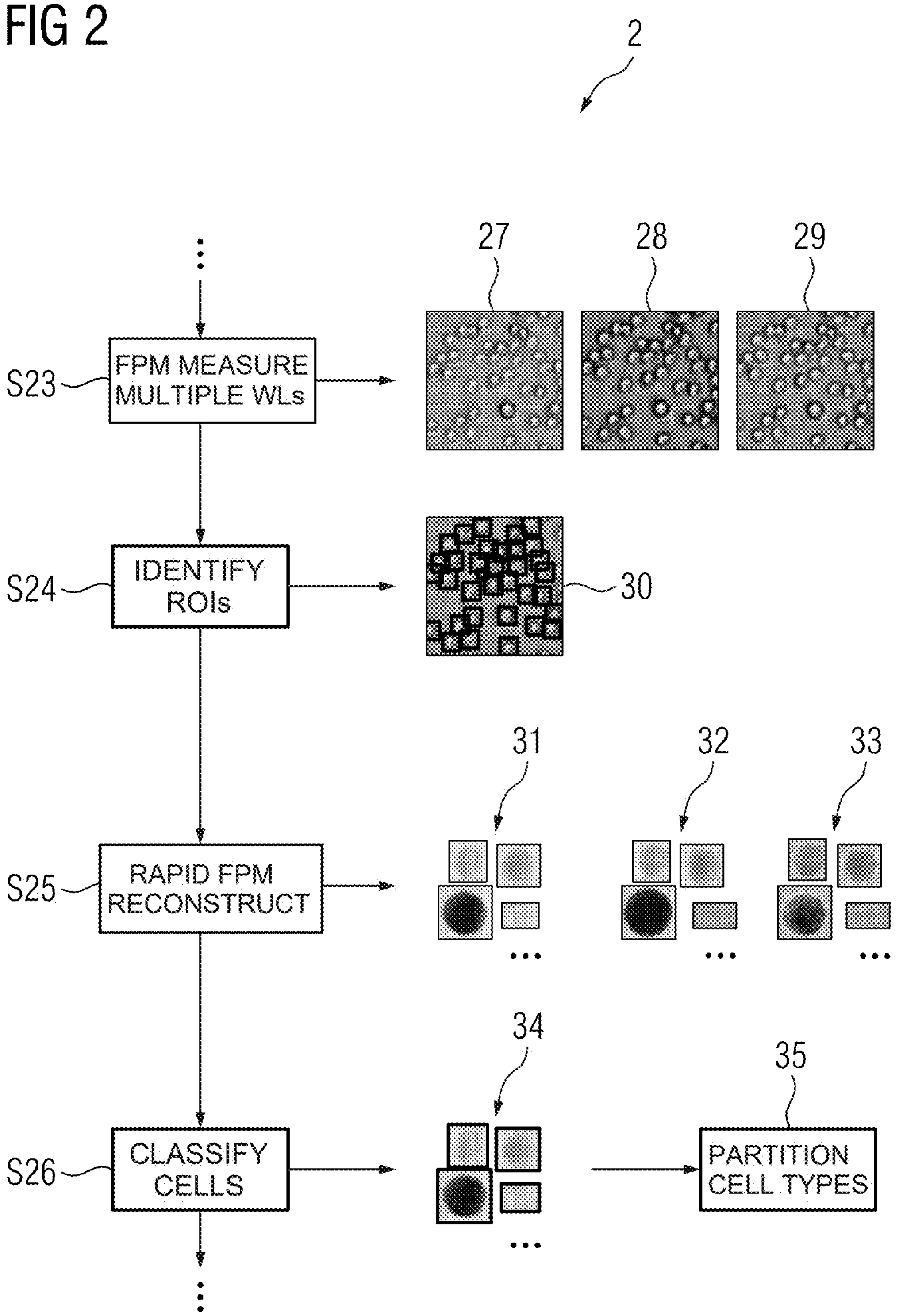
FIG. 2 shows schematically a method comprising a workflow (2) of rapid identification and reconstruction of regions of interest, ROI (38), and/or cells.

FIG. 2 shows schematically a method comprising a workflow (2) of rapid identification and reconstruction of regions of interest, ROI (38), and/or cells. A more detailed workflow is depicted and described which can partially or completely correspond with the method steps (S11 to S13, or S11 to S14) shown in FIG. 1. A method step (S23) comprises carrying out an FPM measurement at multiple wavelengths Lambda 1, Lambda 2, etc., which provides raw images at the corresponding wavelengths, i.e., Image Lambda 1 (27), Image Lambda 2 (28), Image Lambda 3 (29), etc.

In a further method step (S24) ROIs (38) are identified on the raw images by employing artificial intelligence algorithms, each ROI (38) comprising a cell as depicted in Image Lambda 1 (with ROIs (38)) (30). The ROIs (38) exhibit rectangular shapes.

In a further method step (S25) a rapid FPM reconstruction of the identified ROIs only is performed at all relevant wavelengths Lambda 1, Lambda 2, Lambda 3, etc. FPM phase images are reconstructed at all the different wavelengths (Phase Lambda 1 (31), Phase Lambda 2 (32), Phase Lambda 3 (33), etc.).

A further method step (S26), preferably equivalent to method step (S14), comprises an AI based cell classification and a ROI (38) determination. In a further method step (S35), partitioning of cell types is performed in the reconstructed FPM images (Phase Lambda 1 (with ROIs (38)) (34)) and, e.g., white blood cells (WBCs), red blood cells (RBCs), and/or platelets are counted based on the output of the previous method step (S26).

Figure 3:
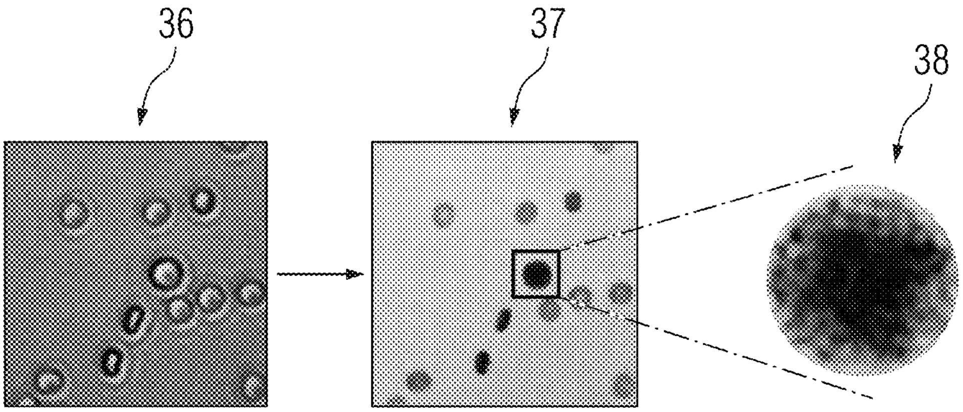
FIG. 3 shows schematically a method comprising WBC differentiation from a phase contrast image of an unstained blood sample in a flow cell.

FIG. 3 shows schematically a method comprising WBC differentiation from a phase contrast image (37) of an unstained blood sample in a flow cell. Depicted is a raw Image (36) of an unstained blood sample in a flow cell. From the Image (36), an FPM Phase image (37) is calculated. A ROI (38) with a single cell is determined. Details of the cell become visible.

The images in FIG. 3 are example images and show only a small, zoomed-in part of a typical full field of view. A typical full field of view of an FPM image according to the invention would be, e.g., about 165 times of the area of the Image (36) or the Phase image (37).

LIST OF REFERENCE SIGNS

1 Method of optically analyzing a biological sample
2 Workflow
27 Image Lambda 1
28 Image Lambda 2
29 Image Lambda 3
30 Image Lambda 1 (with ROIs)
31 Phase Lambda 1
32 Phase Lambda 2
33 Phase Lambda 3
34 Phase Lambda 1 (with ROIs)
36 Image
37 Phase Image
38 ROI
S10-S26 Method steps
S35 Method step

The invention claimed is:

1. A method of optically analyzing a biological sample, the method comprising:

i) providing a biological sample,
ii) introducing the sample into a flow-cell via a first inlet port or applying the sample onto a specimen holder,
iii) optically analyzing the sample in the flow-cell by obtaining at least for a part of the sample situated within a first volume of the flow-cell multiwavelength Fourier Ptychography Microscopy (FPM) data, or
iv) optically analyzing the sample on the specimen holder by obtaining at least for a part of the sample situated within a first area on the specimen holder multiwavelength FPM data,
v) identifying regions of interest based at least on part of the FPM data of the sample obtained in step iii) or iv) by employing an artificial intelligence (AI) algorithm,
vi) reconstructing an amplitude or phase image of the sample only in the regions of interest obtained in step v) based on the FPM data for the regions of interest to minimize the computational time required for the FPM reconstruction process, wherein the multiwavelength FPM data comprises data measured at least at two different wavelengths.

2. The method according to claim 1, wherein each area of interest comprises at least or precisely one biological particle.

3. The method according to claim 1, wherein the identifying regions of interest comprises reconstructing a high-resolution FPM image at only a single wavelength of the multiwavelength FPM data, wherein this high-resolution FPM image is used to (a) identify regions of interest and (b) classify cells located within the regions of interest.

4. The method according to claim 1, wherein identifying regions of interest comprises reconstructing a high-resolution FPM image employing at least one subset of the multiwavelength FPM data, wherein each subset constitutes an image of the entire part of the sample for which FPM data was obtained, wherein this high-resolution FPM image is used to (a) identify regions of interest and (b) classify cells located within the regions of interest.

5. The method according to claim 1, wherein the regions of interest are determined in raw images and wherein only those regions of interest are reconstructed, wherein the regions of interest are determined without determining the cell types of cells within the regions of interest.

6. The method according to claim 1, wherein classification of cells within the regions of interest into RBCs (red blood cells), WBCs (white blood cells) and Platelets is performed after completion of image reconstruction, wherein completion of image reconstruction comprises image reconstruction for all different wavelengths or subsets of the multiwavelength FPM data.

7. The method according to claim 1, wherein phase images are obtained at different wavelengths and are used to calculate cell thickness or hemoglobin concentration.

8. The method according to claim 7, wherein measurements at different wavelengths are employed to decouple hemoglobin concentration and cell height or to determine the volumes of platelets.

9. The method according to claim 1, wherein the sample comprises a blood smear, a pathology slide, or bacteria for microbiology analysis.

10. The method according to claim 1, wherein the biological sample was obtained from a patient prior to performing any step of the method.

11. The method according to claim 1, wherein the sample comprises blood cells or is a blood sample.

12. The method according to claim 1, wherein the sample is unstained.

13. The method according to claim 1, wherein red blood cell parameters of a CBC (complete blood count) are calculated or a cell classification and WBC (white blood cell) differentiation is determined using an artificial intelligence based algorithm based on amplitude or phase images.

14. An automatic analyzer for optically analyzing a biological sample, the analyzer comprising a flow-cell with a first inlet port for introducing the sample into the flow-cell, or
means for applying the sample onto a specimen holder, the analyzer further comprising,
a Fourier Ptychography Microscope (FPM) for optically analyzing the sample in the flow-cell by obtaining at least for a part of the sample situated within a first volume of the flow-cell multiwavelength FPM data or for optically analyzing the sample on the specimen holder by obtaining at least for a part of the sample situated within a first area on the specimen holder multiwavelength FPM data, and
a control module comprising computer means which are configured for identifying regions of interest (38) based at least on part of the FPM data of the sample obtained by employing an artificial intelligence algorithm and for reconstructing an amplitude or phase image of the sample only in the regions of interest based on the FPM data for the regions of interest to minimize the computational time required for the FPM reconstruction process, wherein the multiwavelength FPM data comprises data measured at least at two different wavelengths.

15. The automatic analyzer according to claim 14, wherein the control module is configured to calculate red blood cell parameters of a CBC (complete blood count) or determine a cell classification and WBC (white blood cell) differentiation based on amplitude or phase images.

16. The method according to claim 1, wherein the multiwavelength FPM data comprises data measured at least at three different wavelengths.

17. The method according to claim 2, wherein the at least or precisely one biological particle comprises at least or precisely one cell.

18. The method according to claim 3, wherein the steps (a) and (b) are performed at the same time.

19. The method according to claim 4, wherein the steps (a) and (b) are performed at the same time.

20. The method according to claim 13, wherein all red cell blood parameters of a CBC (complete blood count) are calculated.

* * * * *